US012439207B2

(12) United States Patent
Kaetel

(10) Patent No.: US 12,439,207 B2
(45) Date of Patent: Oct. 7, 2025

(54) LOUDSPEAKER SYSTEM

(71) Applicant: Kaetel Systems GmbH, Munich (DE)

(72) Inventor: Klaus Kaetel, Munich (DE)

(73) Assignee: KAETEL SYSTEMS GMBH, Munich (DE)

( * ) Notice: Subject to any disclaimer, the term of this patent is extended or adjusted under 35 U.S.C. 154(b) by 88 days.

(21) Appl. No.: 18/352,662

(22) Filed: Jul. 14, 2023

(65) Prior Publication Data

US 2023/0362546 A1 Nov. 9, 2023

Related U.S. Application Data

(63) Continuation of application No. PCT/EP2022/051255, filed on Jan. 20, 2022.

(30) Foreign Application Priority Data

Jan. 21, 2021 (DE) ......................... 102021200554.3

(51) Int. Cl.

| | |
|---|---|
| ***H04R 7/04*** | (2006.01) |
| *H04R 1/28* | (2006.01) |
| *H04R 9/02* | (2006.01) |
| *H04R 29/00* | (2006.01) |

(52) U.S. Cl.

CPC ............. *H04R 7/04* (2013.01); *H04R 1/2803* (2013.01); *H04R 9/025* (2013.01); *H04R 29/003* (2013.01)

(58) Field of Classification Search

CPC ........................................................ H04R 7/04

See application file for complete search history.

(56) References Cited

U.S. PATENT DOCUMENTS

| | | | | |
|---|---|---|---|---|
| 6,056,083 | A | 5/2000 | Daniell | |
| 10,309,594 | B1 | 6/2019 | Baldwin et al. | |
| 2007/0258617 | A1 | 11/2007 | Henry | |
| 2011/0002495 | A1 | 1/2011 | Song | |
| 2013/0089224 | A1 * | 4/2013 | Dehe ...................... | H04R 19/02 381/191 |

(Continued)

FOREIGN PATENT DOCUMENTS

| | | |
|---|---|---|
| DE | 198 19 452 C1 | 1/2000 |
| EP | 3 061 266 | 8/2016 |

(Continued)

OTHER PUBLICATIONS

International Search Report dated May 18, 2022, issued in application No. PCT/EP2022/051255.

*Primary Examiner* — Sunita Joshi
(74) *Attorney, Agent, or Firm* — McClure, Qualey & Rodack, LLP

(57) ABSTRACT

A loudspeaker system includes a transducer configured to transduce an electrical signal into sound waves, and having a clamped diaphragm configured to be deflected by the electrical signal, wherein the diaphragm has a deflection region which is deflectable in relation to a resting position of the diaphragm, and a clamping region which is less deflectable, or non-deflectable, in relation to the deflection region, a housing within which the transducer is arranged, the housing having perforations to allow the sound wave to exit to an external environment, wherein the perforations are arranged on the housing predominantly to be closer to the clamping region than to the deflection region.

18 Claims, 8 Drawing Sheets

(56) References Cited

U.S. PATENT DOCUMENTS

| | | | | |
|---|---|---|---|---|
| 2013/0243238 | A1* | 9/2013 | Zhao | H04R 7/045<br>381/430 |
| 2016/0061438 | A1 | 3/2016 | Lu | |
| 2017/0155989 | A1 | 6/2017 | Jeon | |
| 2020/0336824 | A1 | 10/2020 | Zheng et al. | |
| 2020/0351595 | A1 | 11/2020 | Rusconi Clerici Beltrami et al. | |

FOREIGN PATENT DOCUMENTS

| | | |
|---|---|---|
| EP | 2 692 144 B1 | 2/2017 |
| EP | 2 692 154 B1 | 9/2017 |
| EP | 2 692 151 B1 | 1/2018 |
| EP | 3 061 262 B1 | 1/2018 |
| TW | 201924365 A | 6/2019 |

* cited by examiner

LOUDSPEAKER SYSTEM

CROSS-REFERENCES TO RELATED APPLICATIONS

This application is a continuation of copending International Application No. PCT/EP2022/051255, filed Jan. 20, 2022, which is incorporated herein by reference in its entirety, and additionally claims priority from German Application No. DE 10 2021 200 554.3, filed Jan. 21, 2021, which is incorporated herein by reference in its entirety.

BACKGROUND OF THE INVENTION

The present invention relates to the field of electroacoustics and, more particularly, to concepts for recording and reproducing acoustic signals.

Typically, acoustic scenes are recorded while using a set of microphones. Each microphone outputs a microphone signal. For an audio scene of an orchestra, for example, 25 microphones may be used. Then, an audio engineer mixes the 25 microphone output signals into, for example, a standard format, such as a stereo format, a 5.1, a 7.1, a 7.2, or other equivalent format. In a stereo format, for example, two stereo channels are created by the sound engineer or an automatic mixing process. In a 5.1 format, mixing results in five channels and a subwoofer channel. Similarly, in a 7.2 format, for example, mixing results in seven channels and two sub-woofer channels. If the audio scene is to be rendered in a reproduction environment, a mixing result is applied to electrodynamic loudspeakers. In a stereo reproduction (reproduction) scenario, there are two loudspeakers—the first loudspeaker receiving the first stereo channel, and the second loudspeaker receiving the second stereo channel. In a 7.2 reproduction format, for example, there are seven loudspeakers at predetermined positions and, in addition, two subwoofers that may be placed at relatively arbitrary positions. The seven channels are applied to the corresponding loudspeakers, and the two subwoofer channels are applied to the corresponding subwoofers.

Utilization of a single microphone arrangement in detecting audio signals and, and utilization of a single loudspeaker arrangement in reproducing audio signals typically neglect the true nature of the sound sources. European patent EP 2692154 B1 describes a set for detecting and reproducing an audio scene in which not only translation is recorded and reproduced, but also rotation and, furthermore, vibration. Therefore, an audio scene is not only reproduced by a single detection signal or a single mixed signal, but by two detection signals or two mixed signals, which are recorded simultaneously, on the one hand, and which are reproduced simultaneously, on the other hand. In this manner, it is achieved that different emission characteristics of the audio scene are recorded as compared to a standard recording, and are reproduced in a reproduction environment.

For this purpose, as it is shown in the European patent, a set of microphones is placed between the acoustic scene and an (imaginary) auditorium in order to detect the "conventional" or translation signal, which is characterized by a high directionality or high quality.

In addition, a second set of microphones is placed above or to the side of the acoustic scene to record a low-quality or low directionality signal that is intended to represent the rotation of sound waves as opposed to translation.

On the reproduction side, corresponding loudspeakers are placed at the typical standard positions, each of which loudspeakers exhibits an omnidirectional arrangement so as to reproduce the rotational signal, and exhibits directional arrangement so as to reproduce the "conventional" translational sound signal. Further, there still exists a subwoofer either at each of the standard positions, or only one single subwoofer at any position.

European patent EP 2692144 B1 discloses a loudspeaker for reproducing, on the one hand, the translational audio signal and, on the other hand, the rotational audio signal. The loudspeaker thus exhibits an omnidirectionally emitting arrangement, on the one hand, and a directionally emitting arrangement, on the other hand.

European patent EP 2692151 B1 discloses an electret microphone that may be used to record the omnidirectional or the directional signal.

European patent EP 3061262 B1 discloses an earphone and a method of manufacturing an earphone that generates both a translational sound field and a rotational sound field.

European patent application EP 3061266 A1, which is intended to be granted, discloses an earphone and a method of manufacturing an earphone configured to produce the "conventional" translational sound signal while using a first transducer, and to produce the rotational sound field while using a second transducer arranged to be perpendicular to the first transducer.

Recording and reproduction of the rotational sound field in addition to the translational sound field leads to a significantly improved and, thus, high-quality audio signal perception which almost gives the impression of a live concert, although the audio signal is reproduced by loudspeakers or headphones or earphones.

This results in a sound experience that is almost indistinguishable from the original sound scene, where the sound is not emitted by loudspeakers but by musical instruments or human voices. This is achieved by taking into account that the sound is not only emitted translationally, but also rotationally and, if necessary, also vibrationally, and should therefore be recorded and reproduced accordingly.

SUMMARY

An embodiment may have a loudspeaker system including: a transducer configured to transduce an electrical signal into sound waves, and comprising a clamped diaphragm configured to be deflected by the electrical signal, wherein the diaphragm has a deflection region which is deflectable in relation to a resting position of the diaphragm, and a clamping region which is less deflectable, or non-deflectable, in relation to the deflection region, a housing within which the transducer is arranged, the housing comprising perforations to allow the sound wave to exit to an external environment, wherein the perforations are arranged on the housing predominantly to be closer to the clamping region than to the deflection region.

Another embodiment may have a method of operating a loudspeaker system, the method comprising: providing a loudspeaker system according to the invention; applying a signal to the transducer so that an electrical signal is transduced to a sound wave and that a portion of the sound waves propagates through the perforations to an external environment of the loudspeaker system.

Another embodiment may have a method of manufacturing a loudspeaker system according to the invention, the method comprising: providing a transducer that transduces an electrical signal to sound waves, clamping a diaphragm so that the diaphragm is deflected by the transduced sound wave, wherein the diaphragm is deflected, within a deflection region, in relation to a resting position of the diaphragm, and is deflected, within a clamping region, to a lesser degree or not at all in relation to the deflection region; providing a housing; arranging perforations on the housing so as to enable the sound waves to exit to an external environment; the perforations being arranged, on the housing, closer to the clamping region than to the deflection region, arranging the transducer inside the housing.

The loudspeaker system according to the present invention includes a transducer which is configured to transduce an electrical signal into sound waves and which has a clamped diaphragm configured to be deflected by the electrical signal. The diaphragm has a deflection region which is deflectable in relation to a resting position of the diaphragm. The diaphragm further has a clamping region that is deflectable to a lesser degree or not at all in relation to the deflection region. The transducer is arranged inside a housing, the housing having perforations to enable the sound waves to exit to an external environment. According to the proposed loudspeaker system, the perforations are predominantly arranged, on the housing, closer to the clamping region than to the deflection region. In particular, the perforations are exclusively arranged opposite the clamping region. It has been found that by arranging the perforations predominantly opposite the clamping region, rotational vibrations generated at the clamping region by the clamped diaphragm may leave the loudspeaker system directly and thus may contribute to a listening experience that is close to a live experience. Advantageously, the housing may be designed to have non-parallel sidewalls or walls. This may, for example, prevent standing waves from being created by the reflection of sound waves inside the housing. Creation of standing waves may be detrimental to the loudspeaker system, particularly at resonant frequencies of the loudspeaker system.

A further aspect of the present invention relates to a method of operating a loudspeaker system. The method includes providing a loudspeaker system as already described herein and applying a signal to the transducer so that an electrical signal is transduced to a sound wave and that a portion of the sound waves propagates through the perforations into an external environment of the loudspeaker system. By using the loudspeaker system described herein when operating the loudspeaker system, predominantly rotational vibrations may leave the loudspeaker system unimpeded. For this purpose, the perforations which allow unobstructed exit of the loudspeaker system are predominantly arranged, on the housing, closer to the clamping region than to the deflection region. In other words, the vibrations of the diaphragm, which occur in the area of the clamped diaphragm as soon as a signal is applied, may leave the loudspeaker system through the perforations located directly opposite. On the other hand, the vibrations which occur in the deflection region, i.e. in the area of the diaphragm which is not prevented from vibrating by the clamping of the diaphragm, are prevented from escaping unhindered through the housing. Rather, the housing or a sound absorbing material mounted on the housing may absorb the sound waves that are generated by the deflection region, and/or reflect them into an interior space of the loudspeaker system. With the operation of the present loudspeaker system, an impression of a live experience may be provided.

A further aspect of the present invention relates to a method of manufacturing a loudspeaker system described herein. The method includes providing a transducer that transduces an electrical signal to sound waves. The method further includes clamping a diaphragm so that the diaphragm is deflected by the transduced sound wave, wherein the diaphragm is deflected, within a deflection region, in relation to a resting position of the diaphragm and is deflected, within a clamping region, to a lesser degree or not at all in relation to the deflection region. In other words, the diaphragm in the deflection region may be excited to vibrate without interference, while the diaphragm in the clamping region may be excited to vibrate to a limited extent only. The method further includes providing a housing and arranging perforations on the housing so as to enable the sound waves to exit to an outer environment; the perforations being predominantly arranged, on the housing, closer to the clamping region than to the deflection region. Finally, the method includes arranging the transducer inside the housing. Advantageously, the transducer may be coupled to a wall of the housing on only one side thereof. As used herein, the term wall is also used to mean side face, and vice versa.

With the loudspeaker system described herein or the method of operating a loudspeaker system, reproduction of the rotational part of the sound field may be achieved which, combined with reproduction of a conventional loudspeaker, achieves a sound experience which is almost indistinguishable from the original sound scene in which the sound is emitted by musical instruments or human voices. By means of the proposed loudspeaker system, it is achieved in particular that the sound may be emitted not only in a translational, but also, in particular predominantly, rotational and possibly also vibrational manner. The rotational vibrations in particular may contribute to providing a listener with an experience of witnessing a live event.

It is understood that individual aspects which are described with respect to the loudspeaker system may also be implemented as a method step, and vice versa. Further details will be discussed within the context of the following description of the figures.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
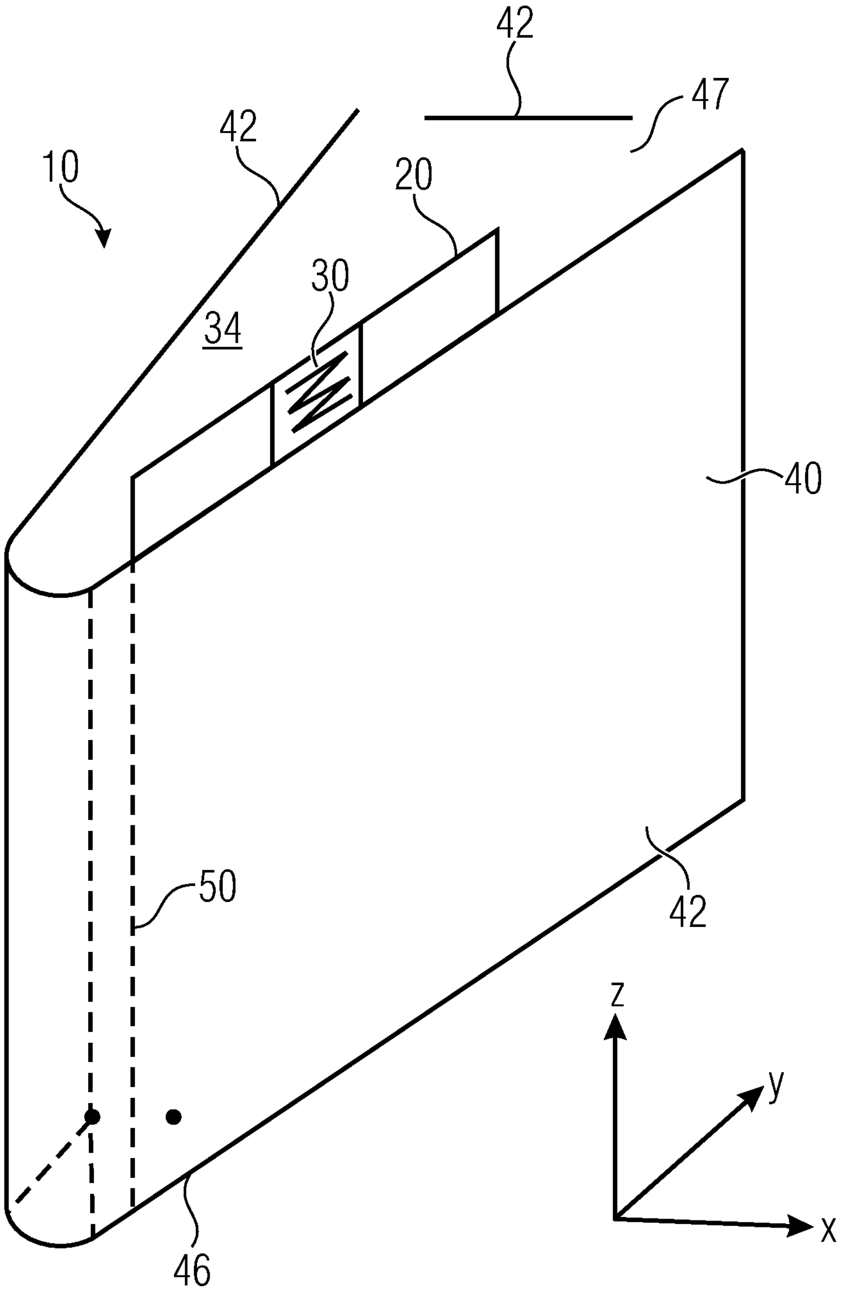
FIG. 1 shows a proposed loudspeaker system in a perspective view.

Individual aspects of the invention described herein will be described below in FIGS. 1 to 7. In the present application, identical reference numerals relate to elements that are identical or identical in action, and not all reference numerals will be presented again in all drawings in case they are repeat themselves.

Figure 2:
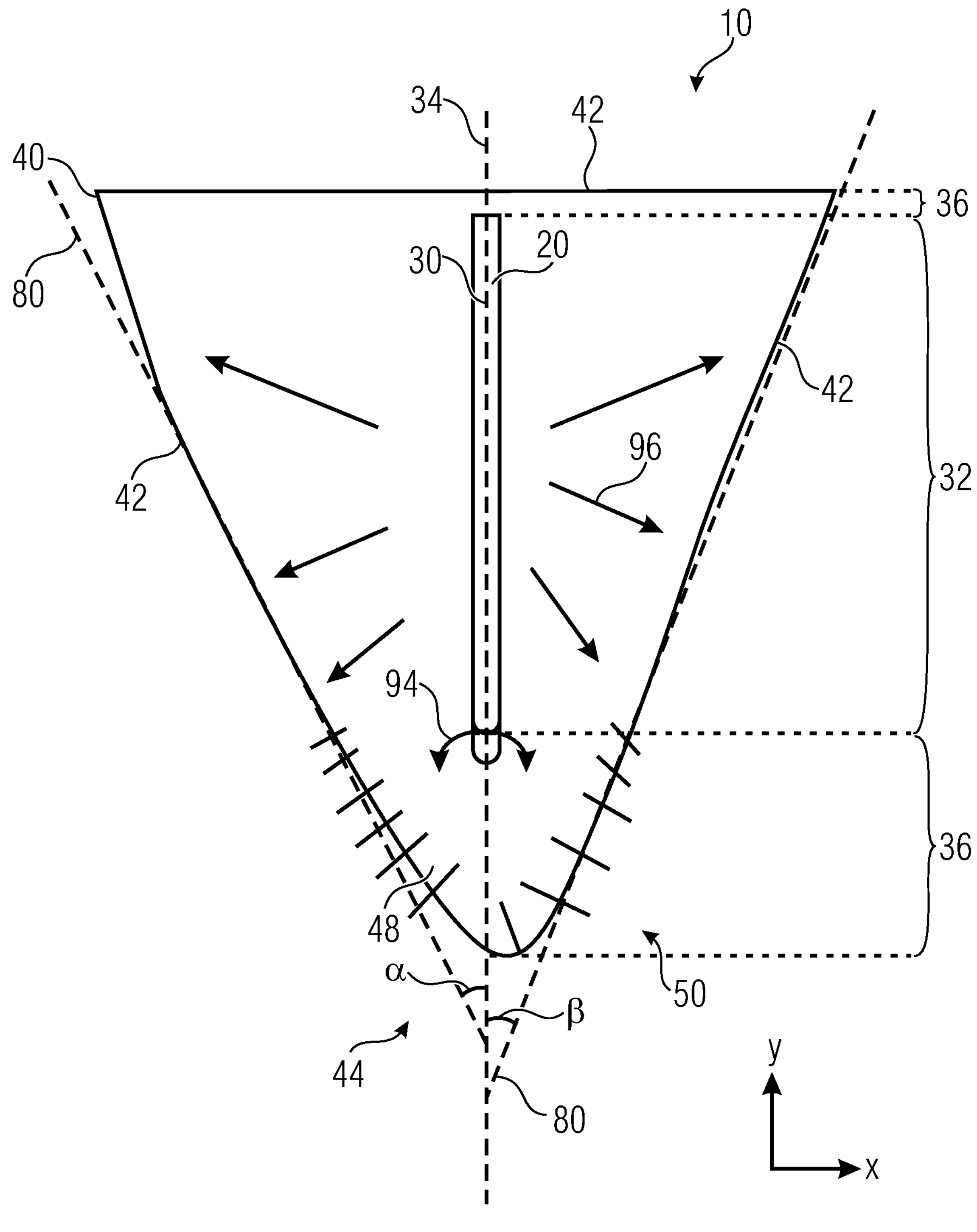
FIG. 2 shows a top view of the loudspeaker system according to FIG. 1.

FIG. 1 shows a proposed loudspeaker system 10 in a perspective view, and FIG. 2 shows a top view of the loudspeaker system 10 according to FIG. 1. The loudspeaker system 10 includes a transducer 20 configured to transduce an electrical signal into sound waves. The transducer 20 comprises a clamped diaphragm 30 configured to be deflected by the electrical signal, the diaphragm 30 having a deflection region 32 which is deflectable in relation to a resting position 34 of the diaphragm 30, and a clamped region 36 which is deflectable to a lesser degree or not at all in relation to the deflection region 32. In FIGS. 1 and 2, the diaphragm 30 is shown in its resting position 34. The resting position is that position which the diaphragm 30 assumes when no signal is applied to the transducer 20. Casually speaking, when the loudspeaker system is turned off, the diaphragm 30 will be in its resting position 34. When a signal is applied to the transducer 20, the diaphragm 30 will be excited to vibrate. Since the diaphragm 30 is clamped inside the transducer 20, the diaphragm has a clamping region 36 in which the vibrations may vibrate in a limited manner only, which is due to the clamping of the diaphragm 30. Furthermore, the diaphragm has a deflection region 32 in which the vibrations may vibrate almost freely. For example, the diaphragm will vibrate within the x-y plane when the diaphragm is in the resting position 34, in parallel with a y-z plane. A corresponding coordinate system is drawn in FIGS. 1 to 4. The clamping region 36 and the deflection region 32 are further indicated by the dashed lines in FIGS. 2 and 3.

The transducer 20 is arranged inside a housing 40, the housing 40 having perforations 50 to enable the sound wave to exit to an external environment. The perforations 50 are predominantly arranged, on the housing 40, closer to the clamping region 36 than to the deflection region 32. In particular, the perforations 50 are arranged exclusively opposite the clamping region 36. This may cause sound waves formed in the vicinity of the clamping region 36 to leave the housing 40 promptly, in particular without prior reflection from the housing 40. It has also been found that the sound waves formed in the clamping region are predominantly rotational vibrations 94. With the proposed loudspeaker system, rotational vibrations may advantageously be released in addition to translational vibrations 96, since the perforations 50 on the housing 40 allow the rotational vibrations to exit directly into an external environment without first being unnecessarily reflected. Consequently, the principle of the present invention may be seen in that the perforations 50 of the housing 40 are arranged where they are closest to the clamping region 36.

Figure 3B:
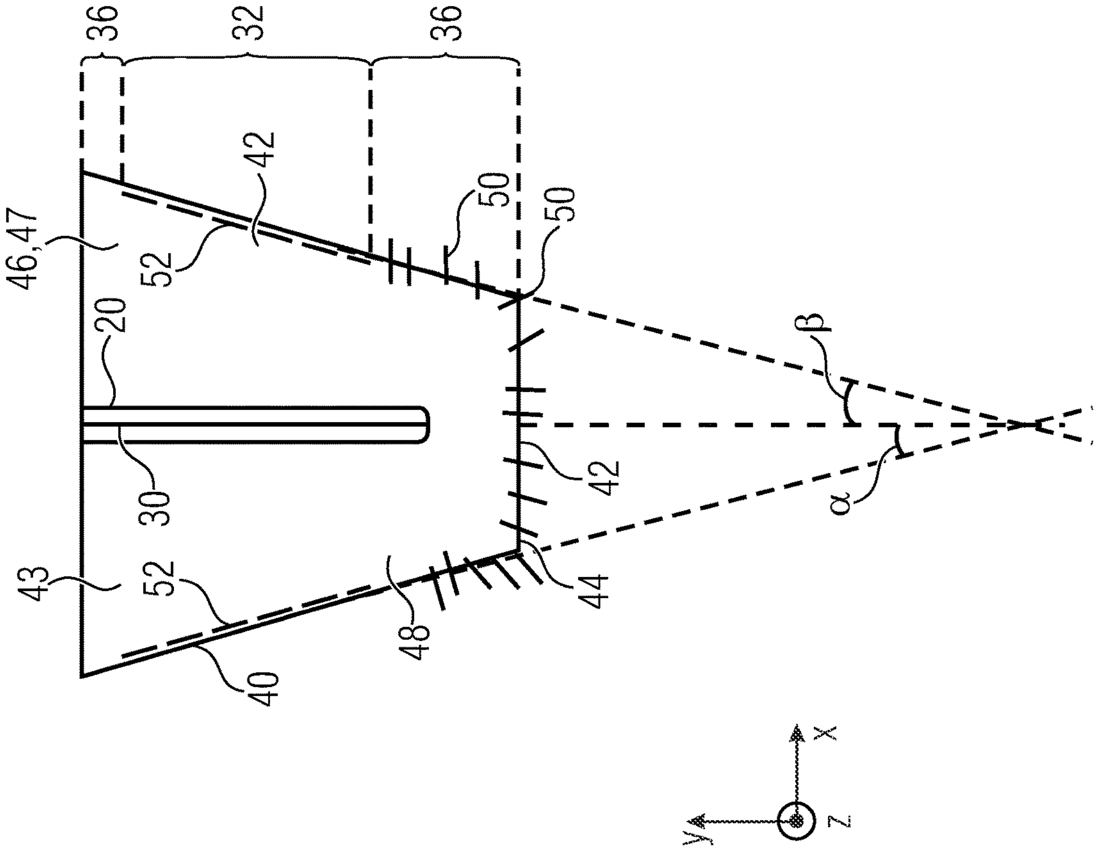
FIG. 3*a, b* show a top view of alternative shapes of the proposed loudspeaker system.
Figure 3A:
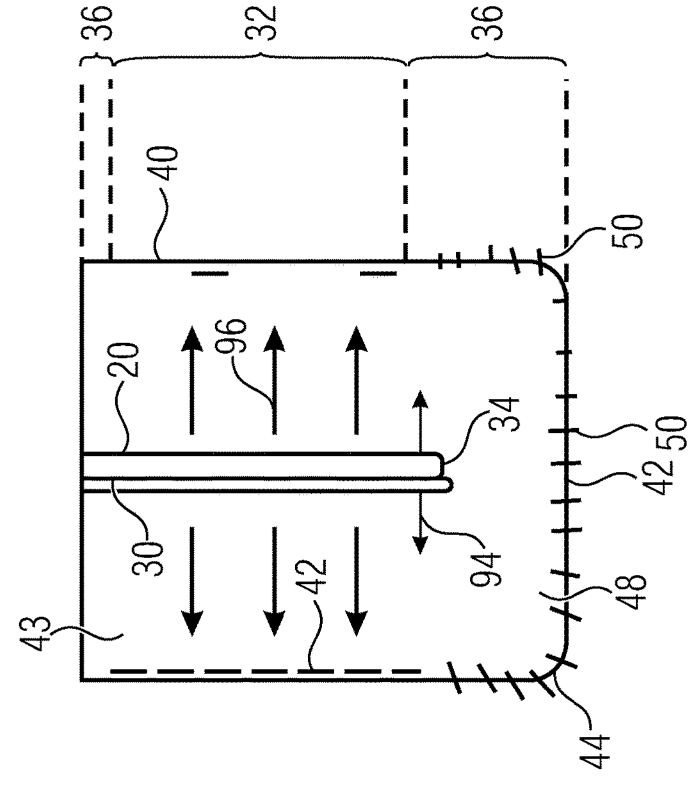

The housing 40 has side faces 42 which are not configured to be parallel to one another. Such side faces 42, which are configured in a non-parallel manner, are shown in FIGS. 1, 2 and **3*b*. In the case of non-parallel side faces, the probability of standing waves being generated when sound waves are reflected from the side faces 42 of the housing 40 may be greatly reduced, in particular eliminated. It is also conceivable that the side faces 42 are configured to be parallel to one another, as is shown in FIG. 3*a*. In such a case, the probability that standing waves may arise may be greater than in case of non-parallel side faces 42. However, creation of standing waves may also be counteracted by placing sound absorbing materials at least partially on the side faces 42 or along the side faces 42**.

Advantageously, the transducer 20 is a patch transducer arranged between the side faces 42, wherein a first angle $\alpha$ is formed between the patch transducer and a first side face 42, and a second angle $\beta$ is formed between the patch transducer and a second side face 42 when a tangent is placed on the side face 42 and an axis is placed through the transducer 20, respectively, as drawn in FIGS. 2 and **3*b*. Here, the first and second angles $\alpha$, $\beta$ are acute angles. Advantageously, the first angle and the second angle are equal, i.e. $\alpha=\beta$, or the first angle and the second angle differ from each other by at most 20%, i.e. $\alpha=\beta\pm20\%$. Particularly advantageously, the first and second angles $\alpha$, $\beta$ each include 15°, i.e. $\alpha+\beta=30°$. Furthermore, it is conceivable that the side faces 42 have a curved shape in a section perpendicular to the side face 42, i.e. in a top view as shown in FIGS. 2 and 3, for example. It is further conceivable that two opposing side faces 42 have two different curve shapes in a section (not shown). For example, one curve shape may be parabolic, and the other curve shape may be a higher-order polynomial or a straight line. However, two mutually symmetrical curve shapes of the side faces 42** are advantageous for aesthetic reasons.

According to one embodiment, conduits 60 are applied to the diaphragm 30 into which the electrical signal may be fed, wherein an array of permanent magnets 62 are arranged on at least one side of the diaphragm 30, which are spaced apart from the diaphragm 30 and spaced apart from one another, so that the sound waves may propagate between the permanent magnets 62. Such conduits 60 are shown schematically in FIG. **4*b*, for example. The conduits 60 may be arranged on the diaphragm 30 in a meandering pattern. The conduits 60 may be applied to the diaphragm 30 in such a way that the conduits 60 form one or more coils 70**.

Figure 4A:
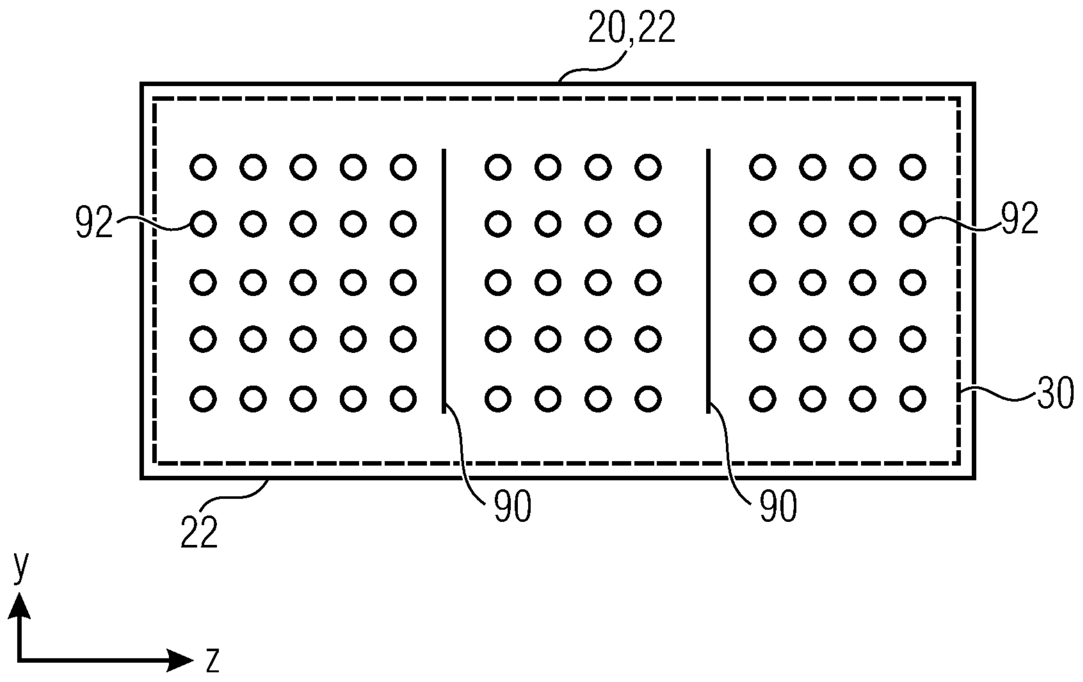
FIGS. 4*a-c* show a top view of the transducer housing (FIG. 4*a*); a top view of the transducer diaphragm (FIG. 4*b*); a side view of the transducer (FIG. 4*c*)
Figure 4B:
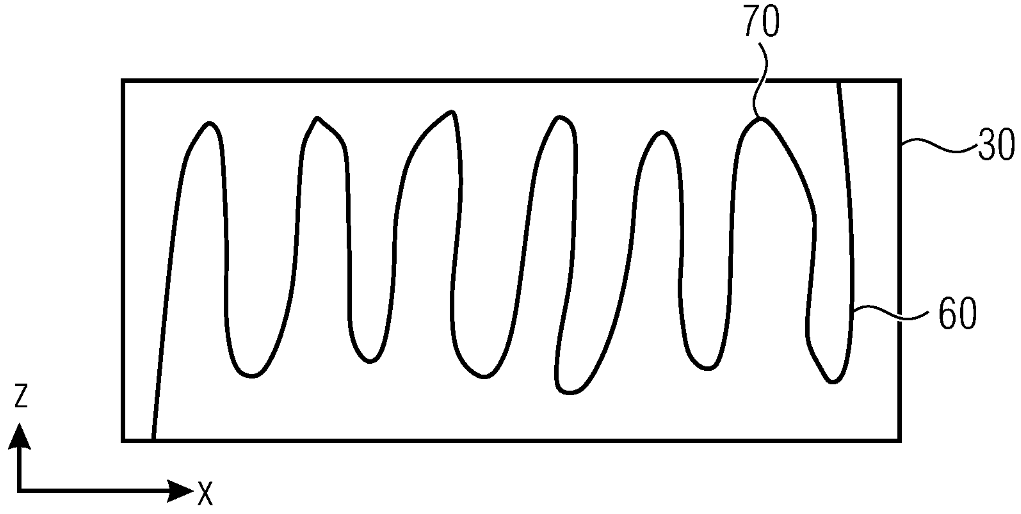
Figure 4C:
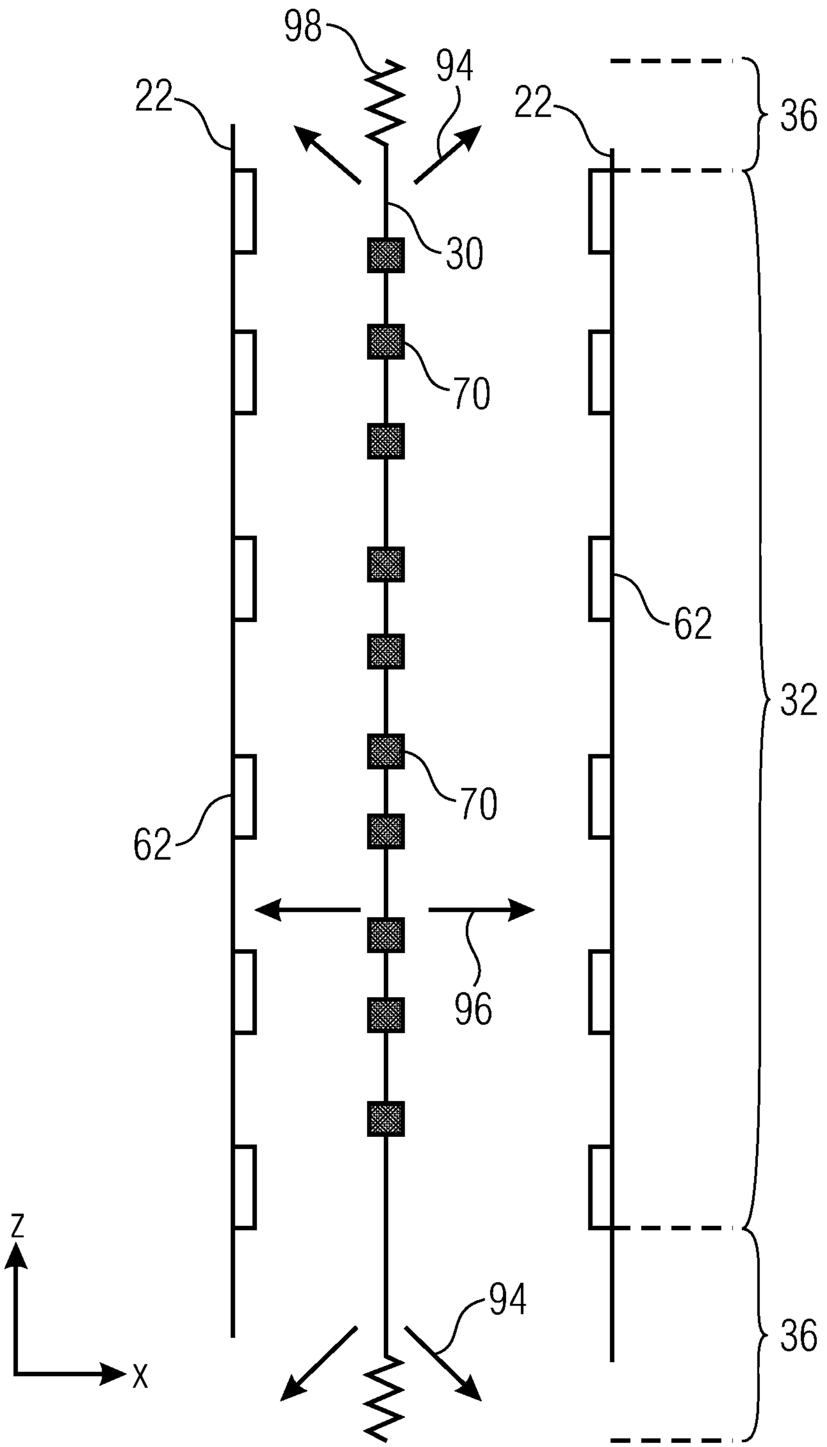
Figure 5:
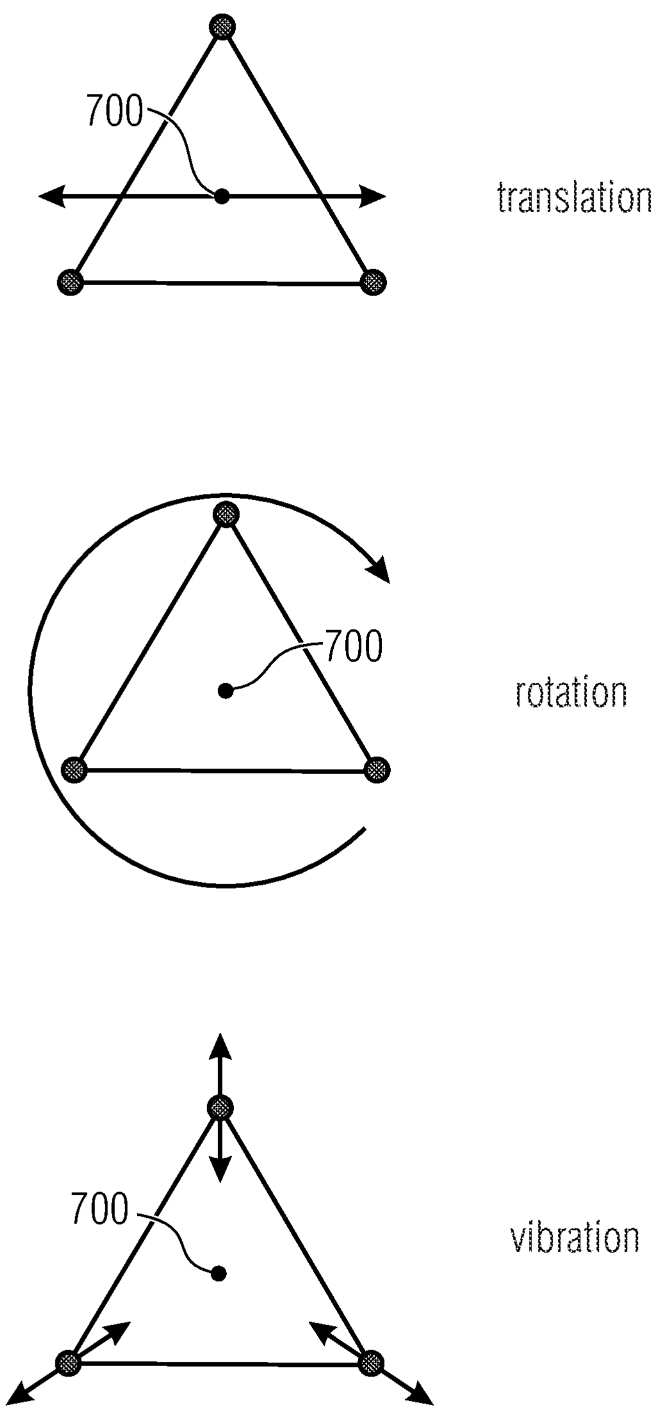
FIG. 5 shows a schematic representation of a translational vibration, a rotational vibration, and a vibrational vibration on a triatomic molecule.

FIG. **4*a* shows a top view of the housing of the transducer 20; FIG. 4*b* shows a top view of the diaphragm 30 of the transducer 20; and FIG. 4*c* shows a side view of the transducer 20. The housing of the transducer 20, i.e., the transducer housing 22, may advantageously have holes 92 and embossments 90. This is schematically outlined in FIG. 4*a*, for example. Sound waves may leave the transducer 22 through the holes 92 of the transducer housing 22. In addition, heat may be at least partially removed through the holes 92 by convection. Improved dissipation of the heat generated may be effected by the transducer housing 22, which is advantageously configured to be metallic. The embossings 90 may act as cold fins to selectively dissipate the heat generated. In addition, the embossings 90 provide stability to the transducer housing 22. The diaphragm 30 is arranged inside the transducer housing 22, the diaphragm being outlined in FIG. 4*b*. FIG. 4*c* shows in a side view that the permanent magnets 62 are spaced apart from the diaphragm 30 and from one another. The permanent magnets 62 are arranged, for example, on an array or directly on a side of the transducer housing 22 that faces the diaphragm 30. The diaphragm 30 may be clamped between two beads 98 (see FIG. 4*c***).

The mutual distances of the permanent magnets 62 may enable the sound waves to leave the transducer 20 unreflected and to enter the space 43 between the transducer 20 and the side face 42. The transducer 20 with its clamped diaphragm is configured to generate translational vibrations 96 in the deflection region 32 and rotational vibrations 94 in the clamping region 36. By virtue of the perforations 50 being arranged closer to the clamping region 36 than to the deflection region 32, advantageously the rotational vibrations 94 generated may leave the housing 40 unreflected, so that advantageously a greater proportion of rotational vibrations 94 in relation to the translational vibrations 96 may reach a user's ear.

The conduits 60 on the diaphragm 30 are configured as coils 70 and are arranged on the diaphragm 30. Advantageously, the conduits 60 are arranged on the diaphragm in a meandering manner, in particular printed thereon. Another array of permanent magnets 62, which are spaced apart from the diaphragm 30 and are spaced apart from one another so that sound waves may propagate between the permanent magnets 62, is arranged also on the second side of the diaphragm 30. In particular, the permanent magnets 62 are arranged in a stationary manner. This means that the diaphragm 30, along with the conduits 60, will move in relation to the stationary permanent magnets 62 when a signal is applied to the conduits 60. Advantageously, an AC voltage is applied to the conduits 60 such that the diaphragm 30 begins to vibrate.

Advantageously, the side faces 42 are connected via a connecting region 44 so that the side faces 42 are closer together in the connecting region 44, the perforations 50 being arranged predominantly or entirely in the connecting region 44. The connecting region 44 is located opposite one of the two clamping regions 36 of the diaphragm 30. The connecting region 44 is configured by the regions of the side faces 42 which are adjacent to one another, in particular which are connected to one another. The perforations 50 are arranged closer to one another in the connecting region 44. In particular, the perforations 50 are arranged closer to one another where two side faces 42 merge into each other.

Advantageously, the side faces 42 extend vertically to a bottom surface 46 and/or to a roof surface 47 of the housing 40. The bottom surface 46 and the roof surface 47 extend parallel to one another and/or are configured congruently with one another. Advantageously, the surface areas of the bottom surface 46 and the roof surface 47 are the same. However, it is also conceivable that the bottom surface 46 and the roof surface 47 run parallel to each other, however that they do not run on top of each other, but offset from each other. In such a case, the side faces 42 are not arranged to be perpendicular to the bottom surface 46 and to the roof surface 47. It is further conceivable that the bottom surface 46 and the roof surface 47 have different surface areas. In such a case, the side faces 42 are not arranged to be perpendicular to the bottom surface 46 and to the roof surface 47. Advantageously, the bottom surface 46 and the roof surface 47 have parabolic surfaces, hyperbolic surfaces or an elliptical surfaces. For example, a parabolic roof surface 47 can be seen in FIGS. 1 and 2. At a vertex of the parabolic or hyperbolic or elliptical surface, the axes of symmetry 80 or tangents 80 belonging to this surface advantageously span an angle of 30°.

Further advantageously, the perforations 50 extend predominantly or entirely along a side face 42 in the connecting region 44, perpendicular to a region 48, about the vertex of the of the parabolic or hyperbolic or elliptical surface. In other words, the region 48 around the apex forms the connecting region 44 in which two side faces 42 are connected to each other.

Advantageously, a sound wave absorbing material 52 is arranged on the bottom surface 46 and/or on the roof surface 47. A sound absorbing material 52 may be arranged on the side faces 42, namely where perforations 50 are not provided on the housing. Indeed, it is also conceivable that a few perforations 50 are arranged on the side faces 42 of the housing, such that the few perforations 50 are located opposite the deflection region 32. This may also enable translational vibrations 96 to leave the housing 40 directly. Advantageously, the side faces 42 are made of metal or of another sound wave reflecting material. By using sound wave reflecting material for the housing 40 and by attaching sound absorbing materials 52 as well as providing the perforations 50, a desired intensity of rotational vibrations 94 and translational vibrations 96 may be selectively delivered to an external environment.

Advantageously, the transducer 20 is attached to a side face 42 at one end and is located opposite, while being spaced apart from, the connecting region 44 at an opposite end. As can be seen, for example, in FIG. 1, the side face 42 to which the transducer 20 is attached lies between the two side faces 42, which are connected to each other via the connecting region 44.

When sound energy is generated, air molecules, for example diatomic and triatomic gas molecules, are excited. There are three different mechanisms responsible for the stimulation. Reference is made to the German patent DE 198 19 452 CI. These three mechanisms are summarized schematically in FIG. 5. The first mechanism, or excitation, is translation. Translation describes the linear motion of the air molecules or atoms with respect to the center of mass of the molecule. The second type of excitation is rotation, in which the air molecules or atoms rotate about the center of gravity of the molecule. The center of gravity is indicated at 700 in FIG. 5. The third mechanism is the vibration mechanism, in which the atoms of a molecule move back and forth toward and away from the center of gravity of the molecules.

Figure 6:
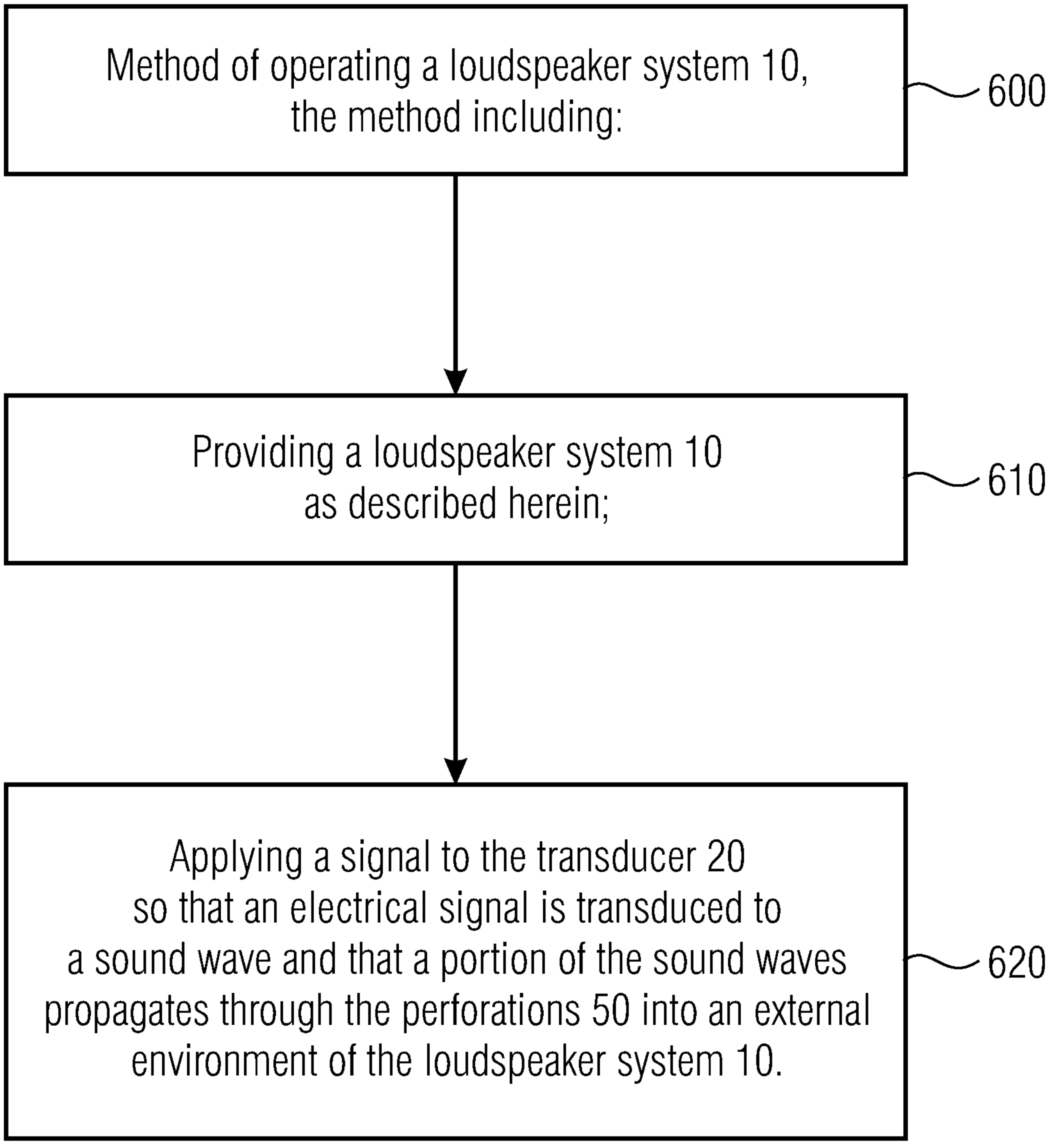
FIG. 6 shows a flow chart of a method of operating a loudspeaker system.

FIG. 6 shows a flowchart of a method 600 of operating a loudspeaker system 10. The method 600 includes, in step 610, providing a loudspeaker system 10 as has been described herein; and in step 620, applying a signal to the transducer so that an electrical signal is transduced to a sound wave and that a portion of the sound waves propagates through the perforations 50 to an external environment of the loudspeaker system 10. Advantageously, an AC signal is applied to the conduits 60 of the coil 70 so as to operate the loudspeaker system 10. This may excite the diaphragm 30 to vibrate in relation to the stationary permanent magnets 62.

Figure 7:
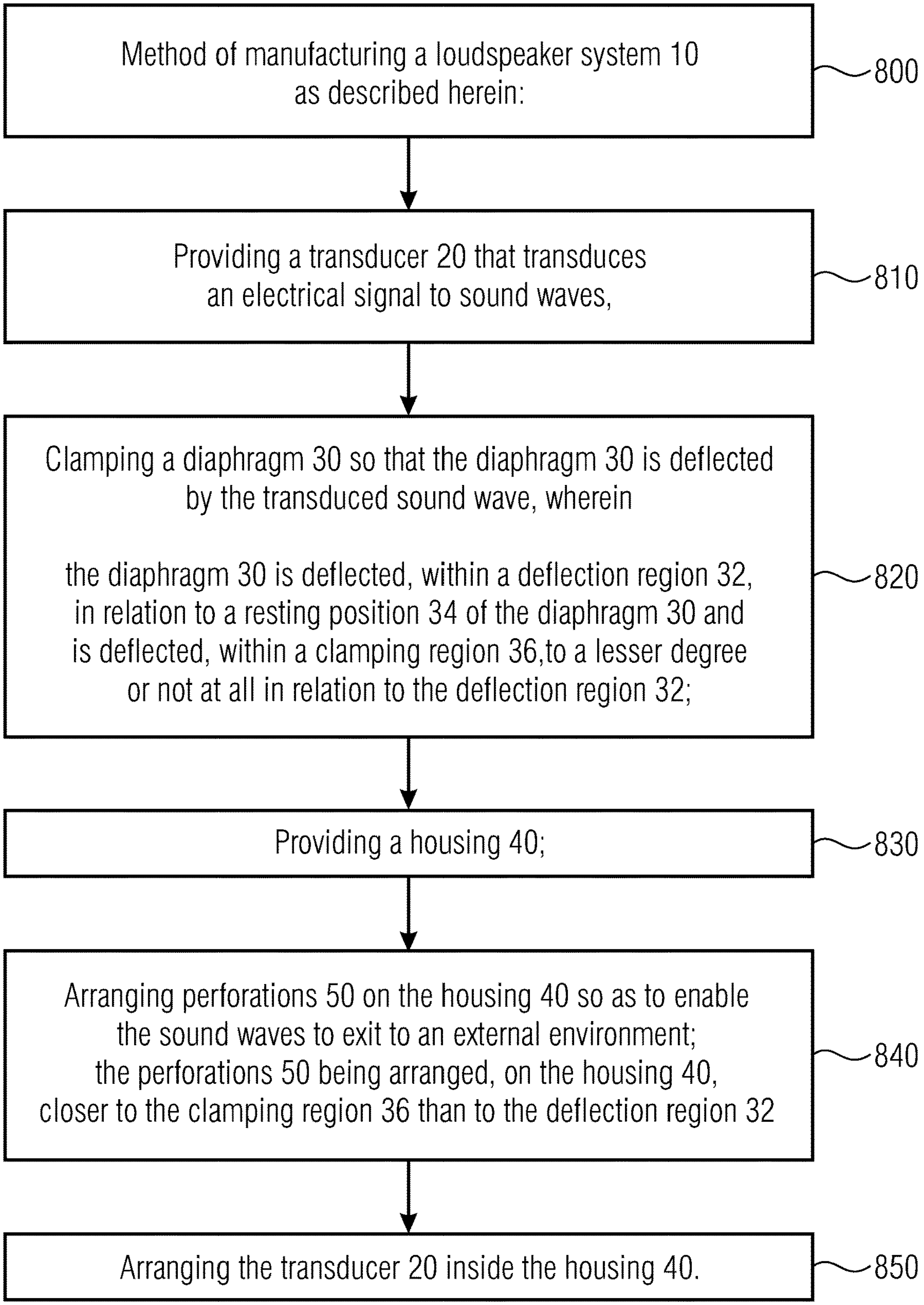
FIG. 7 shows a flowchart of manufacturing a loudspeaker system.

FIG. 7 shows a flow chart of manufacturing a loudspeaker system 10. The method 800 includes, in step 810, providing a transducer 20 that transduces an electrical signal to sound waves, and shows, in step 820, clamping a diaphragm 30 so that the diaphragm 30 is deflected by the transduced sound wave, wherein the diaphragm 30 is deflected, within a deflection region 32, in relation to a resting position 34 of the diaphragm 30 and is deflected, within a clamping region 36, to a lesser degree or not at all in relation to the deflection region 32. Step 830 includes providing a housing 40, and step 840 includes arranging perforations 50 on the housing 40 so as to enable the sound waves to exit to an outer environment; the perforations 50 being arranged, on the housing 40, closer to the clamping region 36 than to the deflection region 32. Step 850 includes arranging the transducer 20 inside the housing 40.

The method 800 of manufacturing a loudspeaker system 10 advantageously further includes determining a geometry of the housing 40; determining a pattern of perforations 50 on the housing 40 such that sound waves may exit the housing via the perforations 50; and manufacturing the housing 40 with the determined geometry and pattern of perforations 50.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

LIST OF REFERENCE NUMERALS

10 loudspeaker system
20 transducer

22 transducer housing
30 diaphragm
32 deflection region
34 resting position
36 clamping region
40 housing
42 side face
43 space
44 connecting region
46 bottom region
47 roof region
48 region
50 perforations
52 sound wave absorbing material
60 conduit
62 permanent magnet
70 coil
80 symmetry axis, tangent
90 embossing
92 hole
94 rotational vibration
96 translational vibration
98 bead
700 center of gravity
600 method
610 step
620 step
800 method
810 step
820 step
830 step
840 step
850 step

The invention claimed is:

1. A loudspeaker system including:

a transducer configured to transduce an electrical signal into sound waves, and comprising:

a clamped diaphragm configured to be deflected by the electrical signal, wherein the diaphragm has a deflection region which is deflectable in relation to a resting position of the diaphragm, and a clamping region which is less deflectable, or non-deflectable, in relation to the deflection region, a housing within which the transducer is arranged, the housing comprising perforations to allow the sound wave to exit to an external environment, wherein the perforations are arranged on the housing predominantly to be closer to the clamping region than to the deflection region, wherein the housing has side faces that are configured to be non-parallel to each other.

2. The loudspeaker system as claimed in claim 1, wherein the transducer is a patch transducer arranged between the side faces, wherein there is a first angle between the patch transducer and a first side face, and there is a second angle between the patch transducer and a second side face, the first and second angles being acute angles.

3. The loudspeaker system as claimed in claim 2, wherein the first angle and the second angle are the same or differ by at most 20%.

4. A loudspeaker system including:

a transducer configured to transduce an electrical signal into sound waves, and comprising:

a clamped diaphragm configured to be deflected by the electrical signal, wherein the diaphragm has a deflection region which is deflectable in relation to a resting position of the diaphragm, and a clamping region which is less deflectable, or non-deflectable, in relation to the deflection region, a housing within which the transducer is arranged, the housing comprising perforations to allow the sound wave to exit to an external environment, wherein the perforations are arranged on the housing predominantly to be closer to the clamping region than to the deflection region, wherein the diaphragm has conduits applied to it into which the electrical signal can be fed, wherein an array of permanent magnets is arranged on at least one side of the diaphragm that are spaced apart from the diaphragm and are spaced apart from one another so that the sound waves may propagate between the permanent magnets, wherein the second side of the diaphragm also has a further array of permanent magnets arranged thereon which are spaced apart from the diaphragm and are spaced apart from one another so that the sound waves may propagate between the permanent magnets.

5. The loudspeaker system as claimed in claim 4, wherein the conduits on the diaphragm are configured as a coil and are arranged on the diaphragm.

6. The loudspeaker system as claimed in claim 4, wherein the second side of the diaphragm also has a further array of permanent magnets arranged thereon which are spaced apart from the diaphragm and are spaced apart from one another so that the sound waves may propagate between the permanent magnets.

7. The loudspeaker system as claimed in claim 1, wherein the side faces are connected via a connecting region so that the side faces are closer to one another in the connecting region, wherein the perforations are arranged predominantly or completely in the connecting region.

8. The loudspeaker system as claimed in claim 7, wherein the perforations are arranged closer to each other in the connecting region.

9. The loudspeaker system as claimed in claim 1, wherein the side faces extend vertically to a bottom surface and/or to a roof surface of the housing.

10. The loudspeaker system as claimed in claim 9, wherein the bottom surface and the roof surface extend in parallel with each other and/or are congruent to each other.

11. The loudspeaker system as claimed in claim 9, wherein the bottom surface and the roof surface each comprise a parabolic surface, a hyperbolic surface, or an elliptical surface.

12. The loudspeaker system as claimed in claim 9, wherein the symmetry axes belonging to the parabolic surface, a hyperbolic surface, or elliptical surface span an angle of 30° at a vertex of said surface.

13. The loudspeaker system as claimed in claim 12, wherein the perforations extend predominantly or completely along a side face within the connecting region in a manner that is perpendicular to a region around the vertex of the parabolic or hyperbolic or elliptical surface.

14. The loudspeaker system as claimed in claim 9, wherein a sound wave absorbing material is arranged at the bottom surface and/or at the roof surface.

15. The loudspeaker system as claimed in claim 1, wherein the side faces are made of metal or of another sound wave reflecting material.

16. The loudspeaker system as claimed in claim 7, wherein the transducer is attached to one of the side faces at one end and is located opposite, in a spaced-apart manner, the connecting region at an opposite end.

17. A method of operating a loudspeaker system, the method comprising:

providing a loudspeaker system as claimed in claim 1;

applying a signal to the transducer so that an electrical signal is transduced to a sound wave and that a portion of the sound waves propagates through the perforations to an external environment of the loudspeaker system;

providing a transducer that transduces an electrical signal to sound waves, clamping a diaphragm so that the diaphragm is deflected by the transduced sound wave, wherein the diaphragm is deflected, within a deflection region, in relation to a resting position of the diaphragm, and is deflected, within a clamping region, to a lesser degree or not at all in relation to the deflection region;

providing a housing;

arranging perforations on the housing so as to enable the sound waves to exit to an external environment; the perforations being arranged, on the housing, closer to the clamping region than to the deflection region, arranging the transducer inside the housing.

18. The method as claimed in claim 17, comprising:

determining a geometry of the housing;

determining a pattern of perforations on the housing such that sound waves may exit the housing via the perforations;

manufacturing the housing with the determined geometry and the determined pattern of perforations.

* * * * *